United States Patent [19]

Izzi, Sr.

[11] Patent Number: 4,620,330
[45] Date of Patent: Nov. 4, 1986

[54] UNIVERSAL PLASTIC PLUMBING JOINT
[75] Inventor: Lewis B. Izzi, Sr., Shelby, N.C.
[73] Assignee: Plastic Oddities, Inc., Shelby, N.C.
[21] Appl. No.: 538,895
[22] Filed: Oct. 4, 1983
[51] Int. Cl.[4] .............................................. E03C 1/26
[52] U.S. Cl. ........................................ 4/288; 4/295;
138/89; 285/42; 285/158; 285/915
[58] Field of Search ................... 285/42, DIG. 2, 58,
285/177, 238, 158, DIG. 16, 59, 60; 4/288, 293, 295

[56] References Cited
U.S. PATENT DOCUMENTS

| | | |
|---|---|---|
| 1,569,875 | 1/1926 | Nixon . |
| 1,792,345 | 2/1931 | Williams ............................ 285/42 |
| 2,425,817 | 8/1947 | Mosca ............................. 285/177 |
| 2,916,311 | 12/1959 | Keplinger ..................... 285/238 X |
| 2,921,599 | 1/1960 | Fleischman ................... 285/177 X |
| 3,148,708 | 9/1964 | Panella . |
| 3,285,289 | 11/1966 | Titus . |
| 3,445,973 | 5/1969 | Stone ............................... 4/293 X |
| 3,457,570 | 7/1969 | Williams .......................... 4/295 X |
| 4,067,072 | 1/1978 | Izzi ............................... 285/177 X |
| 4,092,745 | 6/1978 | Oropallo .............................. 4/288 |
| 4,146,939 | 4/1979 | Izzi .................................. 4/288 X |

FOREIGN PATENT DOCUMENTS 507685 5/1953 Belgium ............................ 285/238

Primary Examiner—Thomas F. Callaghan
Attorney, Agent, or Firm—Laurence R. Brown

[57] ABSTRACT

Plastic plumbing joint assemblies of a universal nature are made available by this invention to provide with a single coupling unit construction a variety of different functions including clean-out access, pipe end dust covers or vents, drain assemblies, threaded pipe to plastic couplings, flush floor or wall mount, snap-in friction fit or permanent solvent welded installation, etc. The integral plastic plumbing coupling joint unit has an internally threaded barrel assembly and outside smooth cylindrical surface mating inside a plastic pipe. If flush fit thereon, a thin rim circumferential flange fits on a floor surface with a flush removable center closure plug for flush mount on a wall. A lower skirt below the threaded barrel presenting a smooth cylindrical inner surface can receive a plastic pipe internally. A thin cover plate or drain plate can be held on by one screw for flush floor mount. A screw in access plug flush mounts on a floor surface by means of indented wrench sockets and provides high pressure sealing capabilities.

6 Claims, 7 Drawing Figures

UNIVERSAL PLASTIC PLUMBING JOINT

TECHNICAL FIELD

This invention relates to plumbing fittings and more particularly it relates to flush mountable plastic plumbing joints that can serve as pipe access clean-outs and which are solvent weldable to the end of a plastic pipe.

BACKGROUND ART

With the advent of plastic pipes and solvent welding techniques the cost of labor in plumbing installations could be significantly decreased. However, the plastic pipes created problems in that they are not adaptable to standard plumbing fittings available for metal pipes. Thus interfacing between metal and plastic plumbing connections required a disproportionate amount of the plumber's time and ingenuity, as did the adaption to plastic pipes of prior art fittings made to fit the conditions of metal pipes.

Furthermore, in the plumbing fitting art, as developed heretofore, different specialty fittings are required for many different functions, making it particularly difficult for the plumber to stock enough different kinds of fittings to meet the problems encountered in the course of his work. For example, one or more different specialty fittings may be required for each of the following listed purposes: clean-out access plug, drain, floor or fabric clamping with and without gaskets, inside pipe mount, outside pipe mount, flush mount, wrench adapter receptacles, cover plates, pipe termial, pipe reduction and enlarging joints, pipe end abutting connection, pipe end non-abutting connection, etc.

Representative of the known prior art pipe end closure fittings are U.S. Pat. Nos. 1,569,875—H. C. Nixon, Jan. 19, 1926 and 3,148,708—P. Panella, Sept. 15, 1964. These provide for fitting metal pipe ends with threaded access caps by means of an intermediate adapter unit compatible with metal pipe. Flush fit on the end of the pipe in Panella is frictionally secured by a rubber O-ring between the fitting and the pipe for engaging the pipe wall frictionally. There is no way to secure this end cap in place to withstand internal pressures or rusted in removable threaded plugs, etc.

U.S. Pat. No. 3,285,289—P. L. Titus, Nov. 15, 1966 provides an adjustable clean-out access fitting for flush mount on a floor and includes a screw-in access plug with an indented wrench receiving socket to avoid floor projections that could cause a person to trip. Flush adjustment is achieved by a series of fittings providing telescopic action by means of screw threads.

Existing plastic pipe fittings commercially available in the art have not been available to withstand considerable pressure and provide leakproof seals for satisfactory use as pipe clean-outs. There are, however, a variety of special purpose fittings for abutting the end of a plastic pipe with dust covers and drain plates mounted thereon, either in solvent welded or snap-in friction fit. These can provide access to internally positioned valves or for clean-out in non-pressurized situations. These substantially constitute a variety of special purpose fittings with plastic cylinders dimensioned for solvent welding or friction fit with a particular dimension plastic pipe. The closure end opening is covered by means of two diametrically spaced screw receiving bosses about the closure end rim for affixing access cover plates or drain plates. In most cases these cylinders have a rather thick flange extending from the cylinder at the closure end serving as a rim about the closure plates.

It is a general objective therefore of this invention to improve the state of this prior art by changing prior art structure to produce a comprehensive universal plastic fitting system for use over a wide range of plumbing problems and which resolves the aforesaid problems of the art. Thus, the plumbing coupling joint assembly of this invention has not heretofore been made available by the art and functions in a mode not heretofore feasible with a single fitting structure.

Other objects, features and advantages of the invention will be found throughout the following description, the drawings and the claims.

DISCLOSURE OF THE INVENTION

Air tight pressure withstanding plastic plumbing coupling joints providing access to drainpipes for clean-out, etc. can be univerally used for interfacing of a plastic pipe with various sorts of functional accessories for dust covering, venting, size change, clamping to floors, etc. In particular, the coupling joint can be installed with little labor and skill by flush mount inside a plastic pipe cut off at the floor surface level, so that it can be covered by carpet, etc. and does not trip up a person with upwardly extending parts. The joint can be friction mounted or solvent welded in place and can abut the end of a pipe or mount flush on the floor and extend to a pipe cut off under the floor.

Thus, a cylindrical pipe connector unit has a thin mounting flange for flush fit on the floor and is internally threaded to receive in air tight pressure holding mating position a screw-in access closure or clean-out plug flush mountable with the flange. Covers, strainers or drain plates may be coupled to the connector joint, or it may be used to couple threaded pipes of different sizes.

THE PREFERRED EMBODIMENT

Figure 1:
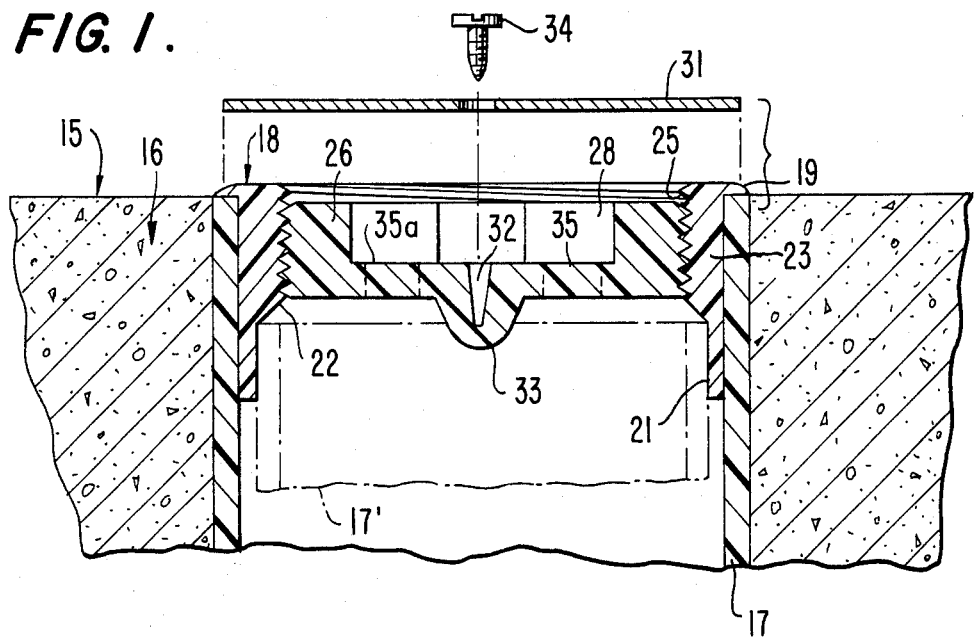
FIG. 1 is an elevation view in section of the pipe coupling joint afforded by this invention embedded in concrete to form a covered flush mounted clean-out access fitting.
Figure 2:
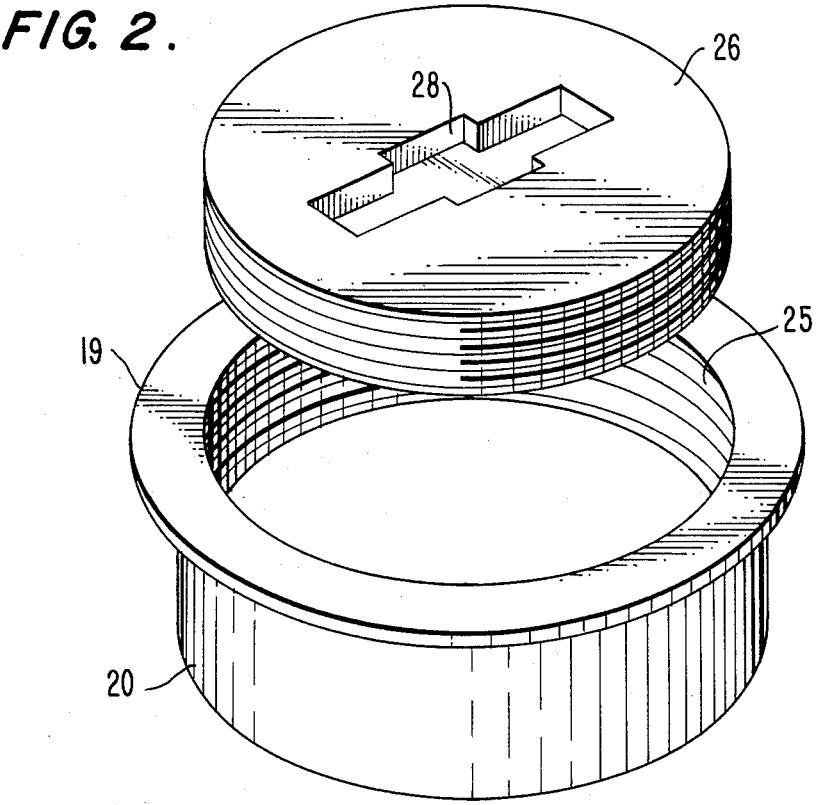
FIG. 2 is a perspective exploded view of the access plug and flanged coupling joint.
Figure 3:
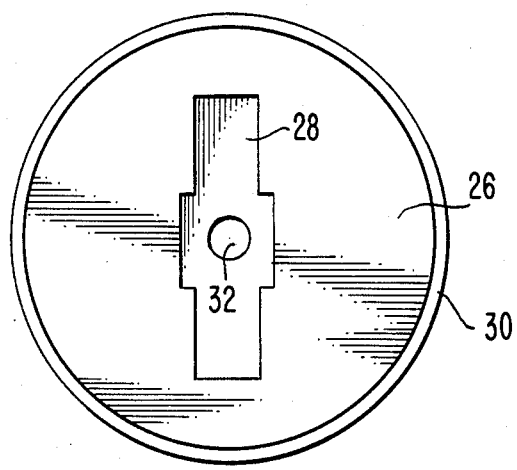
FIG. 3 is a plan view of the access plug.

A plastic coupling joint in the form of an air tight, pressure withstanding clean-out access termination to a plastic drainpipe line for flush mount on a floor or wall surface 15, such as in the concrete floor 16 is shown in FIGS. 1 to 3. For flush mount with simplified installation, the plastic drain pipe 17 is cut off flush at the floor 15 surface after concrete 16 is in place. The integral plastic coupling joint unit 18 has a thin upper retaining flange 19 about its rim for flush mount so thin (typically 3 mm) that it hugs closely to the floor surface so that carpets, etc. may cover the access coupling, which even if uncovered has no protruberances to trip over. It is installed simply by removable snap-in friction fit or permanent solvent welding (to retain pressure). The cylindrical barrel assembly of coupler 18 thus has an outer diameter surface 20 dimensioned to fit snugly inside drainpipe 17. The rim retainer flange 19 extending circumferentially at right angles from the coupling joint upper cylinder to form the flush mount structure abuts the top edge of the drainpipe 17 at the floor surface 15 in this installation mode.

Conversely, the retainer flange 19 may permit the cylindrical barrel of the coupling joint to extend fully below the floor surface 15 having an aperture therein and abut the end of the phantom pipe 17' below the floor surface on the inner cylindrical surface of the skirt portion 21 of the barrel assembly terminating at the lower end of the coupling joint unit 18 and extending to the sloped end 22 of a thicker threaded cylindrical wall portion 23.

Internal screw threads 25 extend downwardly from the top of flange 19 to the lower end of the thickened barrel portion 23 which is disposed along a major portion of the barrel interior surface to permit the screw threads 30 of mating threaded plug 26 to be screwed in below the surface level if desired and to adapt to multiple usage as hereinafter described in more detail.

The removable threaded access flat topped flush mounting plug 26 by means of its plastic to plastic threaded mating position withstands considerable gas or fluid pressure when required, with the cylindrical coupling unit 18 welded in place. The access plug can be removed by a suitable wrench or tool by means of the recessed socket indentation 28. This indentation 28 is preferably about ¾ inch (0.2 cm) deep and defines two differently shaped sockets axially centered in the plug 26, namely a substantially square socket and a substantially rectangular socket with a height smaller and a length greater than one side of the square socket.

If desired for decorative purposes or for keeping dust out of the socket indentation 28, means are provided for mounting a thin cover member 31, diametrically coextensive with the flange rim 19, over the plug 18 in its flush mount position. Thus, the closed end cavity 32 axially centered in the bottom of the socket indentation 28 within the boss mass 33 is a receptacle for the single screw 34 required to mount the plate 31. If the plate 31 is apertured the assembly may serve as a drain unit. For this purpose, knock-out portions 35, 35A of plastic in the cavity 28 bottom for example are suitably placed to permit water to drain through the plate 31, the plug 28 and down the drainpipe 17.

Figure 4:
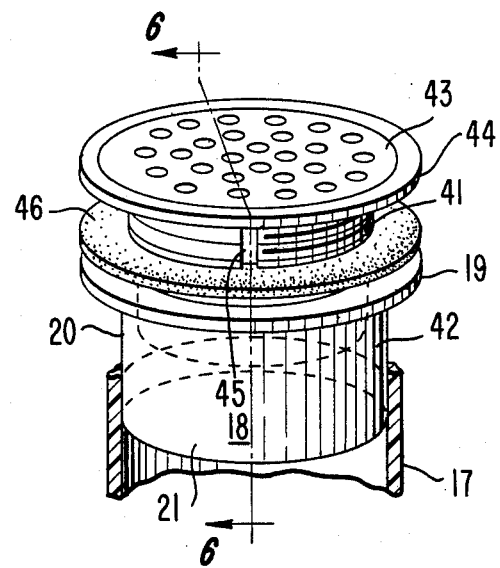
FIG. 4 is a perspective view, partly in section, of the joint between a drainpipe and a drain.

As may be seen in FIG. 4, the inner screw threads of the coupling unit 18 may receive the hollow cylindrical outer threaded 41 cylindrical drain assembly unit 42 having the apertured drain plate 43 mounted in the flanged rim 44. Drain slot 45 may be provided in the threads 41 to supplement the drainage passageway axially extending through the drain assembly and coupled drainpipe 17. In this type of installation the drain may be clamped in the bottom of a shower stall for example or may have a fabric clamped in place under flange 44 and above flange 19 in the coupling joint unit 18. Thus, a ring gasket sealing member 46 is shown.

Other screw threaded assemblies may be barrel mated by threading into the coupling joint unit 18 to present an outer flange 44 coextensive with the retainer flange 19 on the coupling joint unit 18, with or without a compressible ring gasket member 46.

It is to be noted that rim retainer flange 19 can seat on a floor surface such as a wood or tile floor to position and hold the coupling joint unit 18 in place for solvent welding or snap friction fit into the drainpipe 17 cut off below the floor surface, as shown, provided there is an overlap of the coupling skirt portion 21 into the open end of pipe 17, typically three inch plastic pipe.

Figure 5:
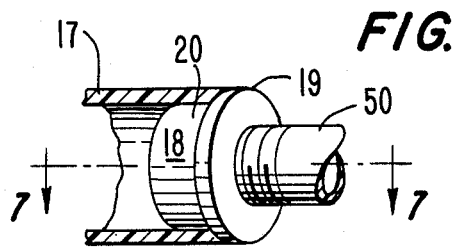
FIG. 5 is a perspective view, partly in section, of the joint between a plastic pipe and a reduced diameter threaded pipe.
Figure 6:
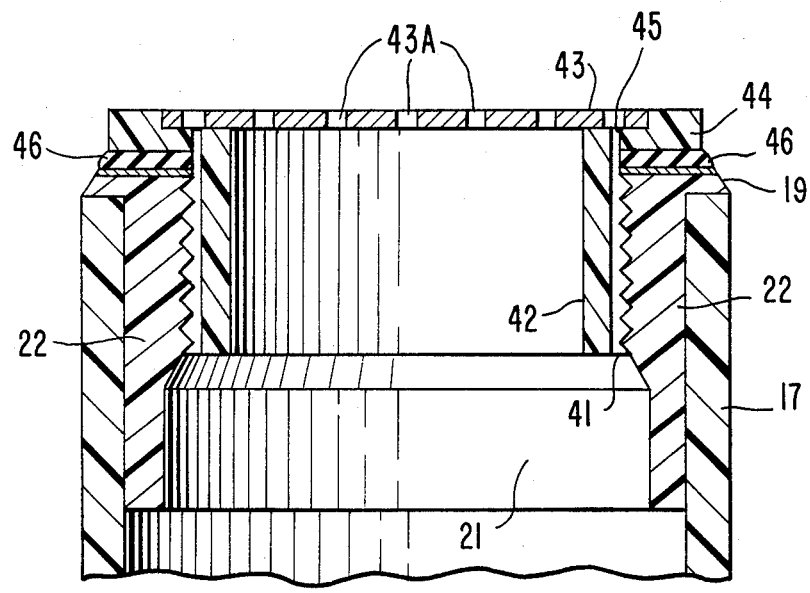
FIG. 6 is a fragmentary vertical sectional view through the structure of FIG. 4.
Figure 7:
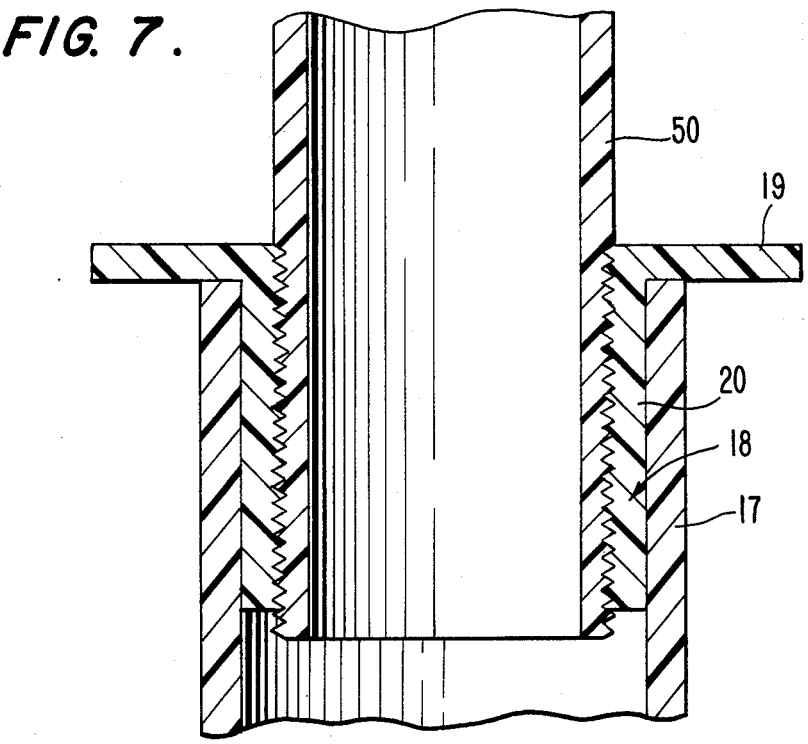
FIG. 7 is a fragmentary vertical sectional view through the structure of FIG. 5.

The screw threads 41 (or 25 on the coupling joint unit 18) are standardized to mate with conventional pipe sizes and pipe threading and are preferably about 10 mm. deep in polyvinyl chloride plastic fittings. Thus, as shown in FIG. 5, the coupling joint unit 18 serves as a pipe size adaptor unit between drainpipe 17 abutting flange 19, into which cylindrical surface 20 mates, and the threaded (metal) pipe 50.

Thus, it is seen that precision cutting of plastic pipe to conform to floor levels is not necessary when using the coupler joint unit 18 provided by this invention, because of its universal characteristics including coupling abutted or overlapping (FIG. 4) inside or outside drainpipes, etc. It can be flush mounted in floors or walls until access is desired as in roughed in powder room installations, etc., and can easily be tiled or carpeted over, if desired. It adapts to threaded inserts of various sorts and thus can couple drainpipes to threaded fittings for venting, straining, draining, etc. as well as conventional threaded pipes. It can serve as a vent or air return. It can hold pressure as a clean-out access port with removable plug, and accept various removal tools and decorative covers, etc. Accordingly, this invention for the first time in the art provides a truly universal plastic plumbing joint, which is entirely unexpected and unobvious from such a simple construction. Also it saves installation costs and in combination with various installation coupling devices provides simpler joint structures than heretofore feasible.

Therefore having advanced the state of the art, those features of novelty believed descriptive of the nature and spirit of the invention are defined with particularity in the claims.

I claim:

1. A flush to the surface mountable universal plumbing coupling joint adaptable for use as a cleanout opening, a drain assembly, a plastic to plastic or metal pipe adapter, and the like, comprising an integral plastic unit characterized by a barrel assembly having an outer cylindrical surface, a thin circular retainer flange extending circumferentially at a right angle from the outer cylindrical surface of said barrel assembly flush with one end thereof and being adapted to lie substantially flush on a plane mounting surface without danger of engaging a foot of a passerby and slightly protruding from said plane mounting surface, said cylindrical barrel assembly below said flange being extended below the floor surface, screw threads extending internally from the flange end along a major portion of the barrel assembly interior surface length, the threaded portion having a predetermined wall thickness for receiving a coaxially positioned screw threaded fitting mated thereinto, and a skirt portion on said barrel assembly extending from the end of the threads to the other end of said barrel assembly defined by a thinner wall thickness than said predetermined thickness, said outer cylindrical surface of said barrel assembly extending from said thin circular retainer flange to the end of said skirt portion at the other end of said barrel assembly and having a circumferential dimension for fitting its entire length inside the end of plastic pipes of standard size to permit solvent welding thereinto, and said skirt portion of said barrel assembly presenting an inner circumferential dimension to permit receipt of a pipe thereinto in an abutting fitting relationship against the end of the threaded wall portion.

2. A coupling joint as defined in claim 1 cooperatively mated in combination with a threaded clean-out plug comprising an integral plastic body characterized by a flat top surface positionable in the screw threads flush with the flange end of said barrel assmebly, and a wrench receiving socket indentation extending inwardly into the flat top surface defining two sockets of different shapt axially centered in the plug, namely a substantially square socket and a substantially rectangular socket with a height smaller and a length greater than one side of the square socket.

3. The combination defined in claim 2 further comprising a plastic mass having a screw receiving closed end cavity defined therein axially centered in said plug at the bottom of the socket indentation, whereby a further fitting, such as dust plate, may be affixed by a single axially directed screw to the combination to rest upon the flange end of said barrel assembly.

4. A coupling joint as defined in claim 1 in combination with an inner cylindrical plastic pipe closely fitting within said skirt portion and abutting the end of the threaded wall portion.

5. A coupling joint as defined in claim 1 further comprising an apertured drainage plate held in place by a drain asssembly screw threaded into said coupling joint and providing a drainage passageway from the drainage plate through said coupling joint.

6. A coupling joint as defined in claim 1 in combination with a second assembly comprising a second screw threaded barrel mating into said first barrel assembly presenting an outer rim flange coextensive with the retainer flange of said barrel assembly and a ring gasket about said second assembly barrel between the flanges of said first and second assemblies to be compressed therebetween.

* * * * *